(12) United States Patent
Varma et al.

(10) Patent No.: US 6,334,141 B1
(45) Date of Patent: Dec. 25, 2001

(54) DISTRIBUTED SERVER FOR REAL-TIME COLLABORATION

(75) Inventors: Pradeep Varma; Suresh Kumar, both of New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/241,991

(22) Filed: Feb. 2, 1999

(51) Int. Cl.[7] .................................................. G06F 15/163
(52) U.S. Cl. .................... 709/205; 709/204; 709/201; 709/203; 709/105; 709/106
(58) Field of Search ..................... 709/204, 205, 709/203, 243, 106, 105, 217, 219, 316, 315, 317

(56) References Cited

U.S. PATENT DOCUMENTS

| | | | |
|---|---|---|---|
| 5,583,993 | * 12/1996 | Foster et al. | 709/210 |
| 5,822,585 | * 10/1998 | Noble et al. | 709/316 |
| 5,841,980 | * 11/1998 | Waters et al. | 709/204 |
| 5,862,330 | * 1/1999 | Anupam et al. | 709/208 |
| 6,078,948 | * 6/2000 | Podgorny et al. | 709/204 |
| 6,151,621 | * 11/2000 | Colyer et al. | 709/204 |
| 6,161,146 | * 12/2000 | Kley et al. | 709/248 |
| 6,182,085 | * 1/2001 | Eichstaedt et al. | 707/104 |

* cited by examiner

Primary Examiner—Dung C. Dinh
Assistant Examiner—Abdullahi E. Salad
(74) Attorney, Agent, or Firm—McGuireWoods, LLP; Stephen C. Kaufman

(57) ABSTRACT

A distributed server for real-time collaboration is substituted for a centralized server to address the problem of the development of unacceptable communication and computation bottlenecks resulting from the use of a one-software-process-based centralized server running somewhere on the available network. The substitute distributed server improves scaleability of real-time collaboration by being based on multiple, independently-communicating, asynchronous, independent (i.e., no shared memory, data, variables, etc.) software processes. The processes can be distributed to multiple machines throughout the network and run simultaneously in order to avoid the centralized server's bottlenecks. To be used, a distributed server requires a disjoint, fully covering partitioning of a work space, wherein it can handle partition hierarchies and groups comprehensively. The distributed server solution is general because of the ability of distributed servers to work with different definitions of a modification. The distributed server solution is extensible because of its simple and comprehensive treatment of inter-partition synchronization.

15 Claims, 6 Drawing Sheets

DISTRIBUTED SERVER FOR REAL-TIME COLLABORATION

BACKGROUND OF THE INVENTION

1. Field of the Invention

The present invention generally relates to collaboration systems implemented on networked computers and, more particularly, to a distributed server that substitutes for a centralized server in real-time collaboration sessions.

2. Background Description

Software for collaborative work, i.e., work involving many users and/or agents falls into two categories of use. One is termed asynchronous collaboration and the other, synchronous collaboration. Examples of software for asynchronous collaboration are groupware such as Lotus Notes and Microsoft Exchange. These along with other examples such as discussion groups where data is changed batchwise have the characteristic that neither do they require, nor do they particularly cater to the concurrent presence of many users and agents in the work environment. The work environment can include all users and agents that use computers that are connected to each other by networks such as the Internet or intranets. In contrast to software for asynchronous collaboration, software for synchronous collaboration is designed to cater to concurrent users and agents. It includes collaboration tools such as chat, concurrent whiteboards and the more sophisticated SameTime environment. These tools provide for real-time interaction among groups using the same shared workspace. Whatever be the work space—document, spreadsheet, CAD drawing, etc.—it can be seen and modified by the collaborators, simultaneously. Modifications to the work space are made available to all group members, immediately and synchronously.

Synchrony in multiple updates made by collaboration participants has to be ensured by the underlying synchronous collaboration implementation. One of the common ways by which this is done currently is by the inclusion of a centralized server. A centralized server is a software process running on one host machine, a computer or computing element, that introduces a serialization order among multiple, concurrent modifications. Thus multiple, simultaneous updates to a shared work space are communicated to the server which converts them into a sequential stream of updates to the work space. The sequential stream of updates is then reflected back to all participants, each of whom is assumed to be running a software process, a client, in order to interact with the work space. Each participant or client thus sees the shared work space develop in an identical manner—basically starting from the same initial state and changing under the same stream of updates—as any other participant or client of the collaboration. This method of streaming updates is parameterised by the definition of a modification. What is a modification? Is it a sequence of user-level operations and/or some translation of the same? Is it the complete, changed work space itself? Is it an object difference—changed work space minus unchanged work space? What is the role of history of serialization in serialization itself? Is there any role? Answers to each of these questions can affect what the collaboration session means to its users and also cause a different implementation of synchronous collaboration. Yet what all of these implementations have in common is their dependence on one server process to make serialization decisions for them. As collaboration needs scale up (e.g., the number of clients changing the work space, the number of changes to the work space, and the number of synchronous views of the work space goes up) the single server process running on a single machine and the interconnection network bringing about communication between the server and the clients can become severely loaded with computation and communication requirements. Indeed since the architecture of the collaboration implementation is such that it focuses all communication to one point in the interconnection network, namely the server's machine, the development of an unbalanced load in the interconnection network takes place. It is possible that the interconnection network cannot effectively service the "hot spot" of communication, viz. the server's machine, despite being relatively lightly loaded in other parts of the network. The result can be unacceptable delays and degradation in performance from the perspective of collaboration participants.

SUMMARY OF THE INVENTION

It is therefore an object of the present invention to address the problem of the development of unacceptable communication and computation bottlenecks in and around a centralized server by providing a way to break the one, centralized software server process into multiple, independently communicating, asynchronous, independent (i.e., no shared memory, data, variables) software processes that comprise a distributed server.

According to the invention, there are provided multiple software processes as part of a distributed server. The distributed server provides a functionality that is equivalent to the basic functionality provided by a centralized server, namely, the modification-serialization functionality. The multiple software processes of the distributed server can be distributed to different machines (which can be heterogeneous or homogeneous) available on the interconnection network and can be run simultaneously on the machines. Thus, the distributed sever can avoid focusing all communication to one point in the interconnection network and can diffuse away the "hot spot" of a centralized server into different parts of the network. The distributed server's processes can also avoid dedicated server machines by residing and running solely on the machines hosting the clients.

The invention disclosed herein provides a method of building a distributed server that substitutes for a centralized server in any real-time collaboration session that satisfies the requirements that: (a) an unchanging disjoint partitioning of the session's complete shared work space (comprising of one or more disjoint partitions that together at any time cover the entire work space at the time) be available at all times during the collaboration session, i.e., although the contents of any partition can be changed in the collaboration session, no partition can be created and/or deleted during the collaboration session; and (b) at least one client (actively or passively) participate in the collaboration session, and that any client that (actively or passively) participates in the collaboration session does so for the entire duration of the session.

Work space partitionings required by a distributed server can very well have hierarchical partitions and other partition groups within themselves. The distributed server is capable of handling hierarchical partitions and other partition groups comprehensively. Multiple partition groups and hierarchies can coexist and be in various stages of simultaneous processing. Partition hierarchies and groups can be created, used, and abandoned dynamically.

The invention disclosed herein is general because distributed servers are able to work in variously-parameterized collaboration sessions, wherein the parameters are the choices that define a modification. The invention disclosed herein is extensible because the inter-partition synchronization it provides to collaboration clients is simple and comprehensive as also is the underlying mechanism that supports inter-partition synchronization.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
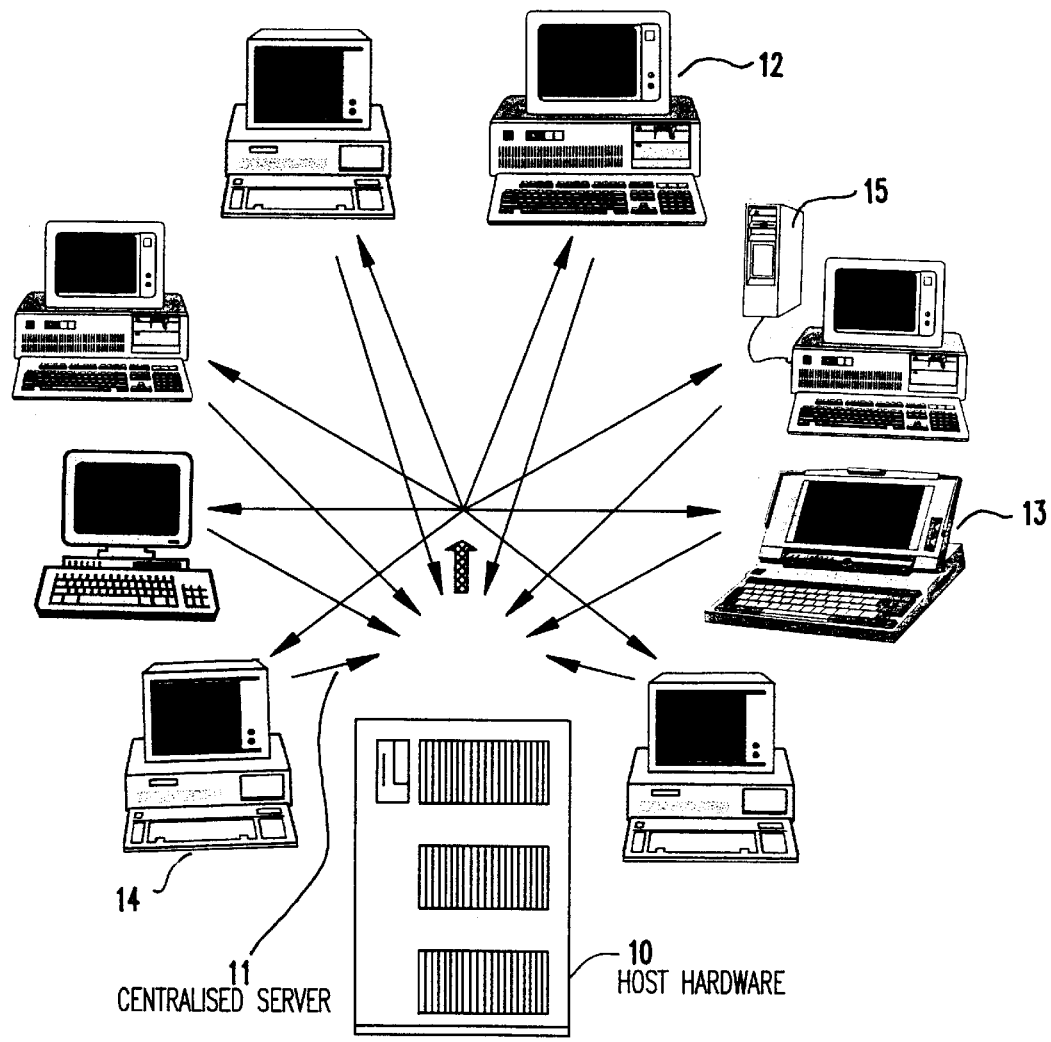
FIG. 1 is a diagram of a conventional centralized server where each screen terminal is hosting a client.

Referring now to the drawings, and more particularly to FIG. 1, there is shown an example of a simple centralized server 11 running on a host hardware system 10. The server is comprised of a first in, first out (FIFO) queue structure in which modifications coming from various clients are entered. These clients are collaboration software frontends which interact with collaboration participants. The clients may be running on desk top computers, such as computer 12, laptop computers, such as computer 13, network computers, such as computer 14, or work stations, such as computer 15. A client sends modifications to the server on a channel that is itself a FIFO structure. The server 11 picks a modification from one of the outputs of channels coming from clients and enters it into its FIFO queue. The order in which modifications get entered in the server's queue forms the order of serialization of modifications. The output of the server's FIFO queue is broadcast to all clients using channels that are FIFO structures. Thus, the architecture of a simple centralized server is channel-order preserving—the order in which a client puts modifications on its channel to the centralized server is preserved in the serialized stream of modifications sent back to the client by the server.

The invention disclosed herein is based on the observation that if a shared work space can be broken into disjoint partitions which can be modified independently of each other, then any concurrent modifications to the partitions need not be sent to one centralized server for the sake of serializing them. Each partition can be assigned an independent server, and only modifications pertaining to that partition need to be serialized by its assigned server. Work spaces can be partitioned in many different ways. Examples are paragraphwise for a text document, tablewise for a spreadsheet application, and objectwise for a three-dimensional application showing three-dimensional objects. Partitions can be hierarchical: the columns of a table can each be a separate partition and the table itself can be a partition that includes all column partitions; a three-dimensional object can itself be comprised of other three-dimensional objects which themselves are distinct partitions. A hierarchical partition can be modified as the entire hierarchy at one time, or it can be modified separately through its individual sub-partitions. A partitioning of a work space into one or more disjoint partitions that together cover the work space needs to be explicitly provided to a distributed server in a collaboration session in order for it to provide a distributed serialization service in the session. Furthermore, the set of partitions comprising the partitioning needs to remain unchanging through the duration of the collaboration session. This means that although the contents of any partition can change during the session, no partition can be added (i.e., created) and/or deleted during the session. The partitioning of a work space can be user supplied, in which case some participants including their assistants explicitly deal with partitions and partition changes for collaborative sessions. Otherwise, the partitioning can be application supplied, in which case the partitioning is generated and maintained automatically by the application software associated with the shared work space. Examples of this are applications that translate their work spaces into NSTP (Notification Service Transport Protocol) partitions such as things.

For applications using NSTP such that a static (i.e., dynamically unchanging) work space partitioning is made available, a distributed server can be plugged in as the serializing backend. So for example, synchrony in an NSTP thing can be maintained by a distributed server. NSTP is restrictive: NSTP does not allow hierarchical partitions or any other grouping of partitions which can be modified together as a group or hierarchy. Thus, maintaining synchrony in an NSTP application exercises a relatively simple part of a distributed server. A distributed server is capable of comprehensively supporting hierarchical partitions and any other partition grouping that can face simultaneous modification in work spaces that are actually used.

The distributed server provides full support for inter-partition synchronization in work space modifications. Besides requiring a partitioning of the work space, a distributed server also requires that one or more clients (collaboration frontends) participate in any collaboration session in which it is used. The participation need not be active. A client can merely be a passive listener. However, at least one client must be present. Furthermore, a distributed server requires that any client which participates at all in its collaboration session does so for the entire collaboration session. In other words, no client can join or withdraw from an ongoing, distributed-server-based, collaboration session.

Partitions used by a distributed server are required to be disjoint. In the context of hierarchical and other grouped partitions, this means that each partition needs to have a corresponding region in the work space that is associated solely with itself and not with any other partition. For example, in the hierarchical table partition mentioned previously, the columns of the table correspond to the column sub-partitions, and the table name corresponds to the table super-partition. The clubbing of the column sub-partitions with the table super-partition for a modification on the table as a whole is supported by distributed servers by the notion of a compound modification. A compound modification is a modification that can affect one or more partitions at the same time. A compound modification can take place over any set of partitions. The set can be a partition hierarchy, which in the example of the table would include the column sub-partitions and the table-name super-partition, and it can also be any related or unrelated collection of partitions. In the table example, it is possible that there is no name for the table and thus no table-name super-partition. In this case, the hierarchy that is the table is treated as a hiervarchy by listing all column sub-partitions in each whole-table, compound modification. The groups and hierarchies that are dealt with through compound modifications can be constant or static throughout a collaboration session, or they can be dynamic, which means that they can be generated, changed, used, and abandoned at various times through the collaboration session. Multiple compound modifications over overlapping and/or non overlapping sets of partitions can be in various stages of processing in a distributed server at any time. Distributed servers provide comprehensive support for inter-partition synchronization using compound modifications.

In order to use a distributed server, a work space modification request (e.g., a file-save operation) has to identify which partitions it can possibly affect and therefore which (remaining) partitions can remain oblivious of and out of synchrony with the modification request. If a multiplicity of partitions is identified for a modification request, then the modification is treated as a compound modification over the identified partitions. If only one partition is identified as affected by a modification request, then the modification may be treated as an ordinary modification over the identified partition although a compound modification over one partition can also be used. For the identified partitions, the given modification will be synchronized with respect to each of them by the distributed server. This means that for any partition that is one of the identified partitions, the position of the given modification in the sequence of modifications over the identified partition as seen by any collaboration client is the same. Furthermore, for every client, it is guaranteed that when the given modification is processed by the client, all modifications preceding the given modification over each of the identified partitions would have been processed by the client. Since each partition is there with an identical content for each client at the start of collaboration, the above implies that processing of the given modification occurs when the state of the identified partitions is the same for every client. In other words, for clients to process a given modification over one or more partitions, their states for the partitions are synchronized to be the same. Since this is true for all modifications of a work space, processing of the work space by its clients proceeds in a synchronous manner when a distributed server is used.

Since a modification request has to identify all partitions that it can possibly affect, an easy answer for the modification request is to identify all partitions. This would lead to each modification being synchronized over the entire work space state. This is neither necessary nor efficient. The closer the identification of possibly-affected partitions is to actually-affected partitions, the lesser is the amount of serialization effort required from the distributed server and the better is the utilization of the distributed server in its serialization purpose. An ordinary modification is more efficient than a compound modification. Thus, it is preferable to use an ordinary modification instead of a compound modification whenever possible.

Figure 2:
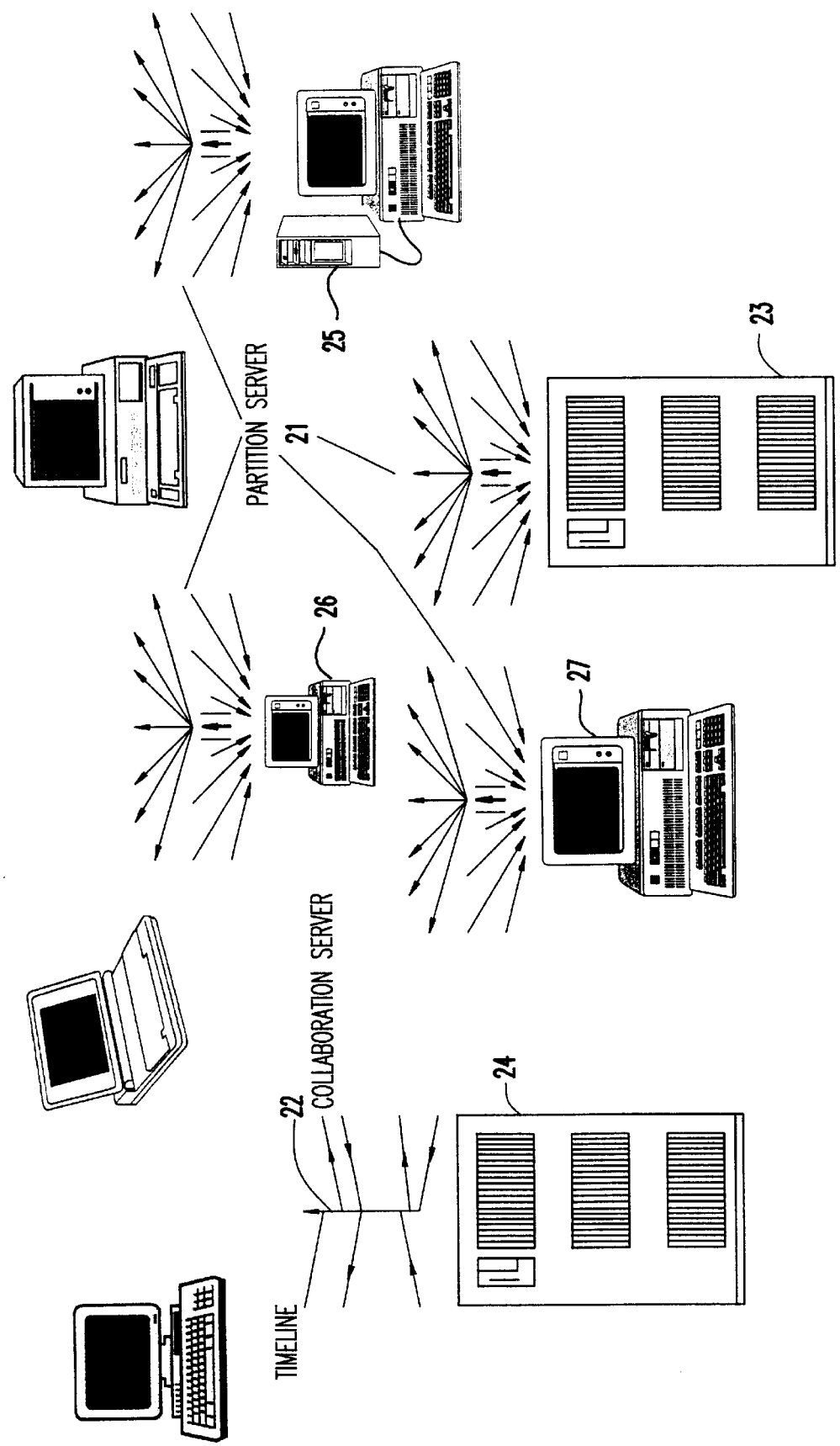
FIG. 2 is a diagram illustrating a distributed server according to the invention where, again, each screen terminal is hosting a client.

FIG. 2 illustrates an example of a distributed server according to the invention. A distributed server includes a server 21 for each partition, i.e., partition servers, illustrated in the flowchart of FIG. 3, and one collaboration server 22, illustrated in the flowchart of FIG. 4, that provides support for compound modifications. The distributed server includes two or more (one collaboration server, and at least one partition server) independently-communicating, asynchronous, independent (i.e., no share shared memory, data, variables) software processes that can run simultaneously on one or more heterogeneous or homogeneous, interconnected computers and/or computing elements, here represented by host hardware systems 23 and 24, work station 25, desk top computer 26, and network computer 27.

Figure 3:
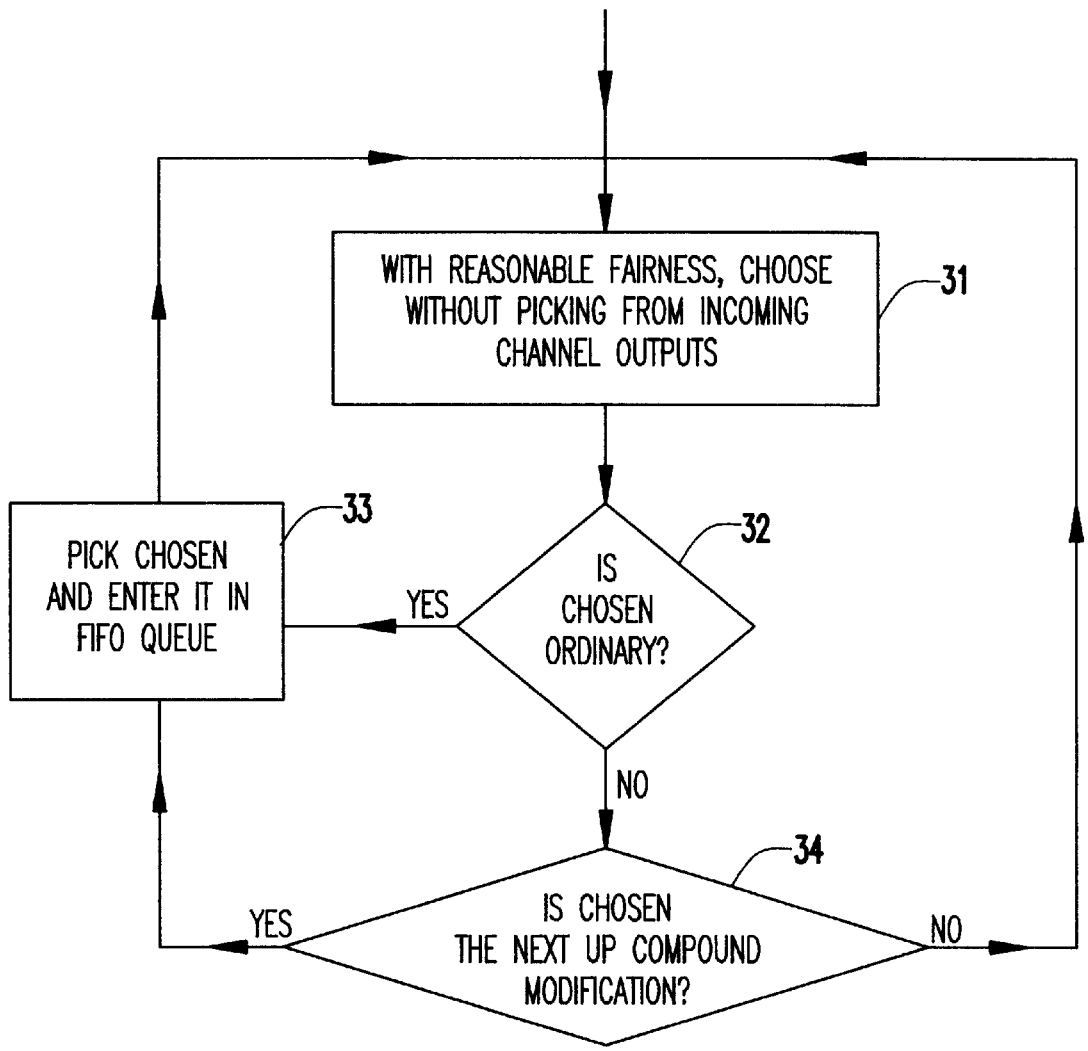
FIG. 3 is a flow diagram of the process of entry of modifications in the FIFO queue of a partition server.

A quick and brief explanation of FIG. 3 is as follows. The partition server process of the partition server is a processing loop which begins with function block 31 in which a modification from one of the incoming channel outputs is chosen with reasonable fairness. A test is then made in decision block 32 to determine if the chosen modification is ordinary. If so, the chosen modification is picked from the channel output and entered in the FIFO queue in function block 33, and the process loops back to function block 31. If not, a further test is made in decision block 34 to determine if the chosen modification is the next to be sequenced compound modification. If so, the process goes to function block 33 where the chosen modification is picked from the channel output and entered in the FIFO queue; otherwise, the process loops back to function block 31 directly, without picking up the chosen modification. The chosen modification is still available at the channel output for being chosen and picked later.

Figure 4:
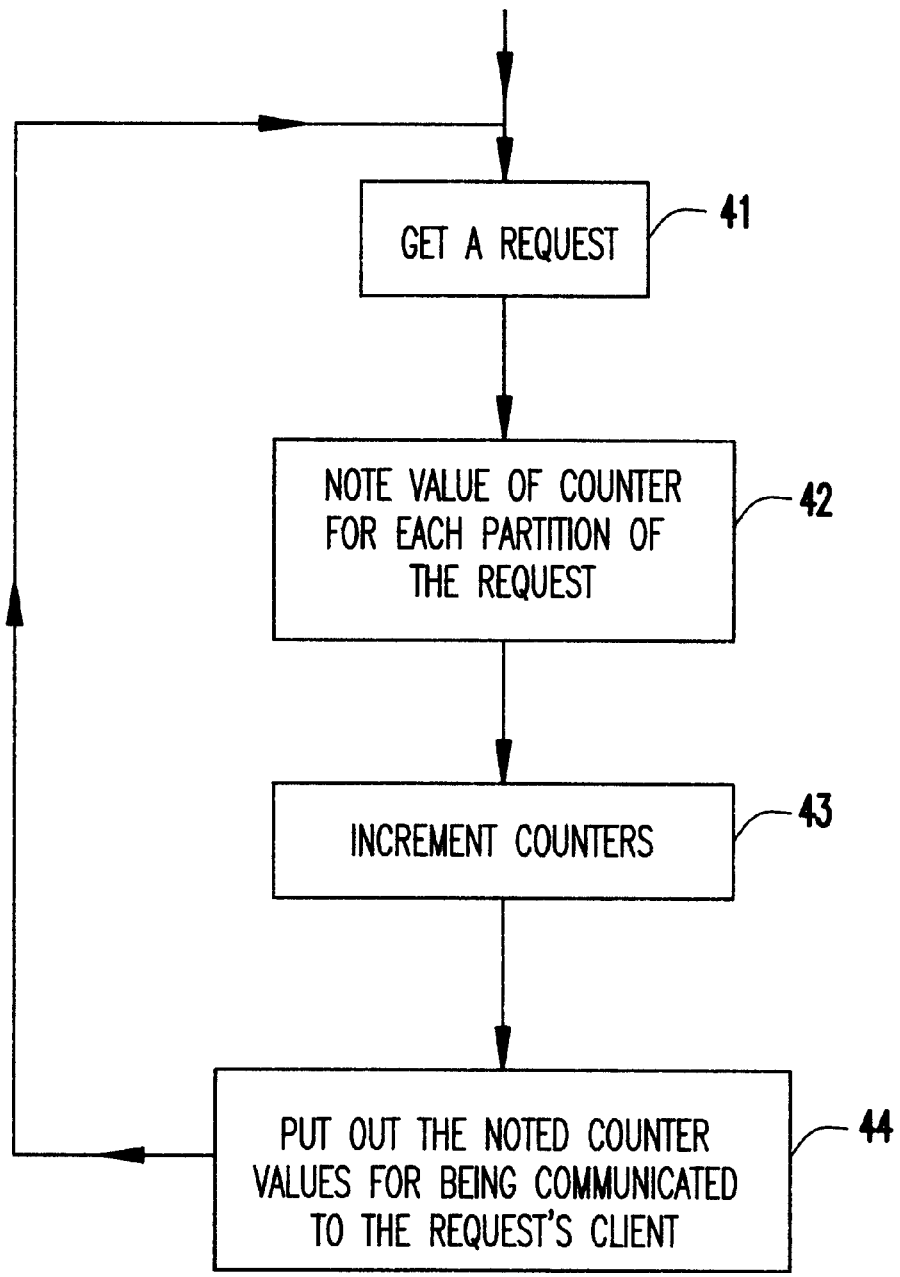
FIG. 4 is a flow diagram of the process of the time line thread of a collaboration server.

A quick and brief explanation of FIG. 4 is as follows. The collaboration server process is based in a time line thread which begins in function block 41 by getting a request to service. The value of a counter for each partition of the request is noted in function block 42 before the counters whose counts are noted are incremented in function block 43. The counter values noted in 42 made available for communicating to the client which made the request in function block 44 before the process noted in 42 loops back to function block 41.

The structure of a partition server is similar to that of a simple centralized server. It is comprised of a FIFO queue to which each client sends modifications on a FIFO channel and from which each client receives serialized modifications on a FIFO channel. The order of entry of modifications into the server's queue forms the order of serialization of modifications on the partition. The order of entry of modifications into the server's queue has to be carried out with some reasonable amount of fairness (refer to comments subsection herein). For instance, the server cannot just pick modifications from one channel and arbitrarily block out other channels forever. Just as in the case of the simple centralized server, a partition server is also channel-order preserving.

Figure 5:
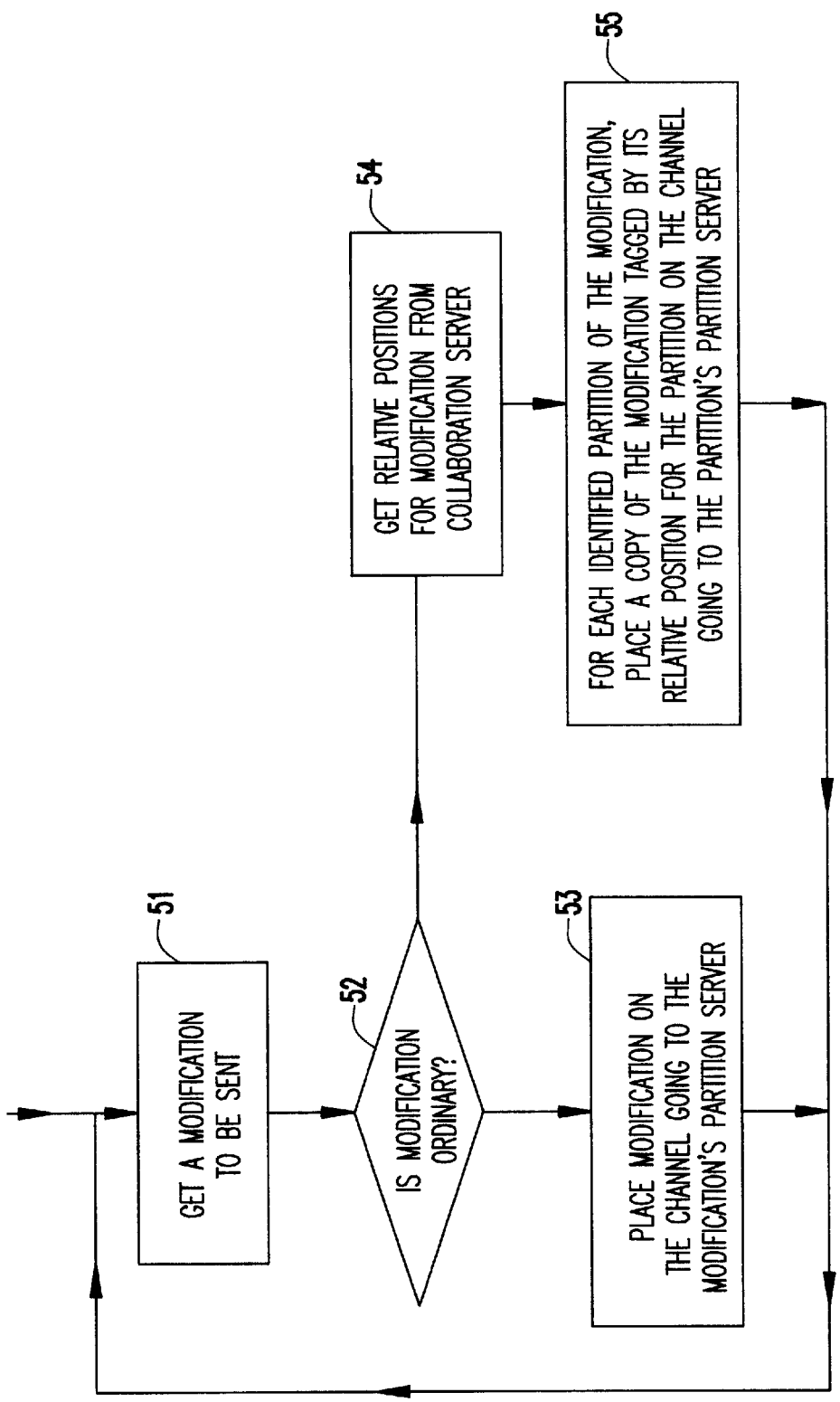
FIG. 5 is a flow diagram of the interface process for sending modifications from a client to partition servers.

Interaction between any partition server and any client uses an interface, illustrated in the flowchart in FIG. 5 and described in the following, by which the client sends modifications to the partition server. The process of FIG. 5 begins by getting a modification to be sent for serialization in function block 51. A test is then made in decision block 52 to determine if the modification is an ordinary modification. If so, the modification is placed on the channel going to the modification's partition server in function block 53, and the process loops back to function block 51. Thus, treatment of an ordinary modification by a partition server parallels the treatment of a modification by a centralized server. When a modification placed on the channel to the partition server by a client later reaches the output of the channel, it is eventually picked up by the partition server and placed in its queue to be broadcast back to all clients including the sending client.

Treatment of modifications that are compound is unique to a distributed server. Such modifications are detected by the test in decision block 52. In order to send a modification as a compound modification, a client has to find out for each of the compound modification's identified partitions, the relative position of the compound modification among the sequence of modifications on the partition. To do this, the client contacts the collaboration server which sends the modification's relative position on each partition back to the client in function block. For each identified partition of the modification, a copy of the modification, tagged by its relative position for the partition, is placed on the channel going to the partition's partition server in function block 55. The process then loops back to function block 51 to get the next modification.

The notion of a relative position has got built into it an ordering relation on relative positions. For any relative position, it is possible to determine which relative positions precede it. If a relative position precedes another, then the latter position is said to succeed the former. Given the ordering relation, it is straightforward to determine between two distinct positions, which precedes or succeeds the other. Once the client has got the relative positions for the compound modification, it processes the compound modification for each identified partition by tagging the modification with the partition's relative position and placing the tagged modification on the channel to the partition's partition server (see FIG. 5). Thus, multiple copies of the modification are sent to different partition servers, each copy carrying its own separate tag (refer to optimization in comments subsection).

When a given tagged compound modification becomes available at the output of a channel to a partition server, the partition server is free to pick it provided the server has already picked and entered tagged compound modifications for all tags that precede the relative position tagging the given compound modification. If this is not the case, then the partition server lets the given modification stay at its channel output till all remaining preceding tagged modifications have been picked by the server from other channels. Thus, the channel of the given compound modification is blocked by the partition server until the server becomes free to pick the compound modification. A partition server thus enforces an ordering on the compound modifications received by it—a compound modification is broadcast by the server only if all its preceding compound modifications have already been broadcast by the server. No ordering is enforced between compound modifications and ordinary modifications, except for the requirement that the partition server pick modifications from different channels with some reasonable amount of fairness.

Once fairness has been accounted for, if an ordinary modification is available at the output of a channel and a compound modification that can be picked next is available at the output of another channel, the partition server is free to pick any of them, thereby allowing any order between them. Thus, the stream of modifications broadcast by a partition server includes compound modifications ordered by their relative positions and ordinary modifications interleaved between the compound modifications.

In the interface of a client for sending modifications to partition servers, modifications generated by the client have to only be processed atomically by the client. Thus, for a given modification, the work space state (which only includes the effects of serialized modifications) available with the same or any other client, except in the intervals when the client is processing a serialized modification, has to either exclude the given modification, or it has to include the given modification fully. A simple way of implementing atomicity in the processing of a modification in the sending interface is to carry out the processing fully in one stretch of computation, making processing of other modifications wait until the processing of the modification is completed, as illustrated in FIG. 5. In this case, for a compound modification, getting relative positions from a collaboration server and placing tagged modifications on outgoing channels for identified partitions would occur in one stretch of computation. A sequential implementation of atomicity in sending modifications is not necessary. For example, an implementation can be such that it allows a client to place ordinary modifications on outgoing channels while the client is in the process of getting relative positions from the collaboration server. In this case, it is straightforward to find a linearization of the modifications so that each sending of modification is atomic. The introduction of concurrency has to ensure that atomicity in sending modifications is not compromised. So for example, an implementation should not allow two compound modifications to be processed concurrently so that the order of relative positions on a common partition for the modifications is the reverse of the order in which the (tagged) modifications get placed on the channel to the partition. In this case, the sending of modifications cannot be linearized in a way that keeps the sending atomic and the system can deadlock.

In order to carry out its activities, a collaboration server maintains one time line of computation on which activities can be sequenced. Any activity carried out on the time line has a well-defined atomicity—it occupies one contiguous stretch of the time line and is not considered attempted unless it is fully carried out. Any portion of the time line can be occupied by at most one activity that is carried out on the time line. In other words, activities carried out on the time line are ordered sequentially with respect to each other. One simple way of implementing the time line of computation is as a single thread of computation that takes as input a request that has to be carried out on the time line, as illustrated in the flowchart provided of FIG. 4. The thread carries out the request fully before taking another request that has to be carried out on the time line. The thread waits in case no request that has to be carried out on the time line is available. Relative position on a partition is implemented as an integer counter for the partition with a well-known initial or starting value, e.g., zero. Thus, checking whether one relative position precedes another requires simply using the less than (<) relation on integers. Other implementations of relative positions are possible, however, the one chosen here suffices along with advantages of simplicity and efficiency. When a request for relative positions on some partitions arrives, the following activity is carried out by the collaboration server on its time line of computation: For each of the requested partitions, the current count of the partition's counter is noted and the counter is incremented. After this activity, the collaboration server returns the noted count on each requested partition to the requesting client as the relative position on the partition.

Figure 6:
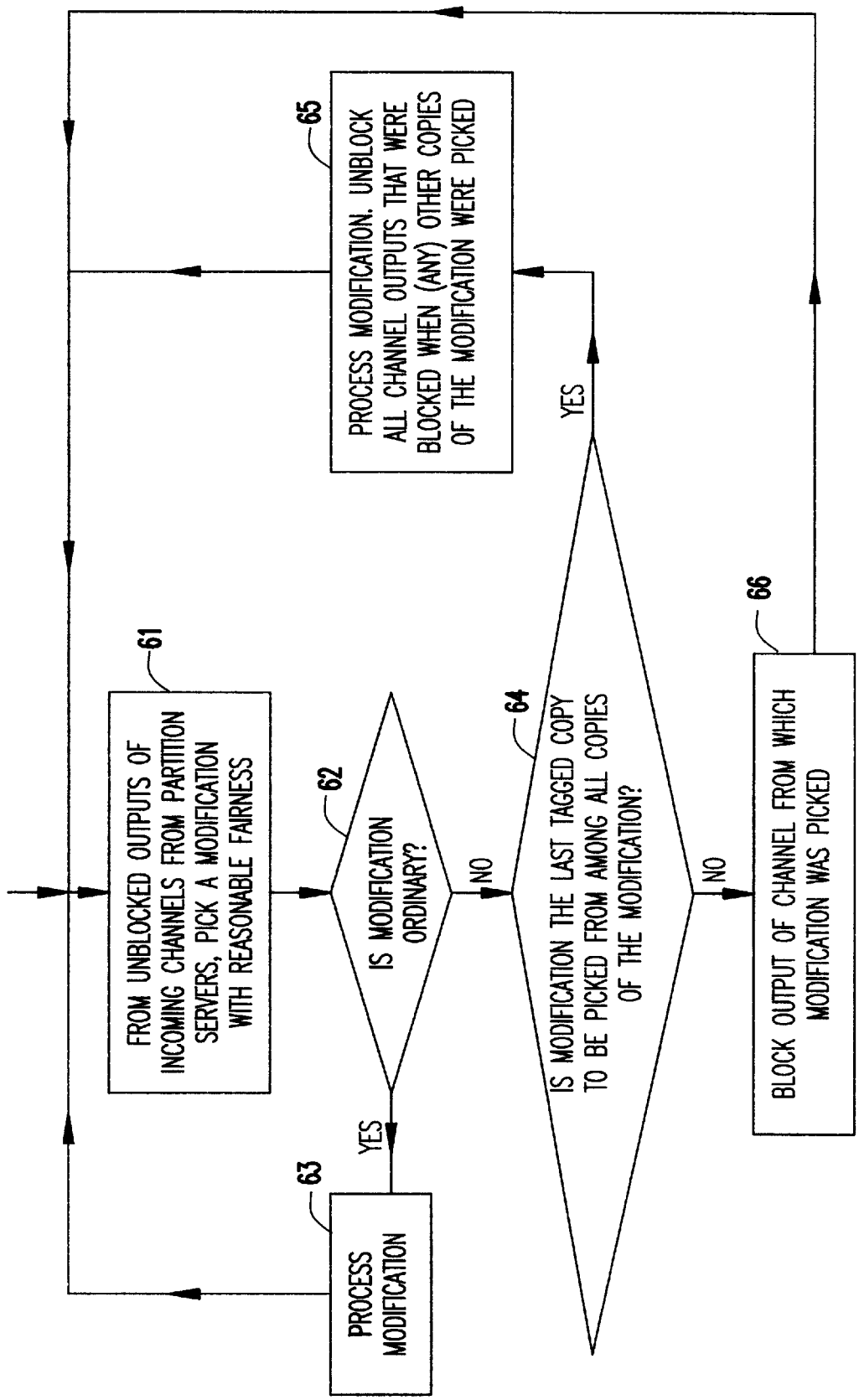
FIG. 6 is a flow diagram of the interface process for a client receiving modifications from partition servers.

The interface, which is illustrated in the flowchart of FIG. 6, for a client to receive serialized modifications from partition servers is described in brief, as follows. In function block 61, a modification is picked with reasonable fairness from unblocked outputs of incoming channels from partition servers. A test is made in decision block 62 to determine if the picked modification is an ordinary modification. If so, the modification is processed in function block 63 before the process loops back to function block 61 to pick the next modification. If not, a further test is made in decision block 64 to determine if the modification is the last tagged copy to be picked from among all copies of the modification. If so, the modification is processed in function block 65. All channel outputs that were blocked when any other copies of the modification were picked are unblocked, and the process loops back to function block 61 to pick the next modification. If, however, the modification is not the last tagged copy to be picked from among all copies of the modification as determined by the test in decision block 64, then the channel output from which the modification was picked is blocked in function block 66 before the process loops back to function block 61 to pick the next modification.

Serialized ordinary modifications arriving at a client channel from different partition servers are independent of each other. Thus, the client is free to interleave ordinary modifications from its incoming serialized streams in any reasonably fair order (refer to comments subsection herein) in order to process the serialized modifications atomically and sequentially. Reasonable fairness rules out behavior such as the client picking modifications from one stream alone and blocking out other streams forever. Among atomic and sequential processing, atomic processing of a modification by a client is required. Sequential processing of serialized modifications is not necessary. The client has to pick from the output of each incoming channel in order to maintain channel order in the channel's stream. Compound modifications in different incoming streams can be related to each other and so cannot be treated independently in general. In order to process a compound modification over identified partitions, the client has to wait for the (tagged) compound modification to become available on the output of the incoming channel for each identified partition. After the compound modification has become available on each identified partition's incoming channel, the modification has to be processed by the client in one atomic step for all identified partitions. This procedure ensures that when a compound modification over identified partitions is processed, any preceding modification over any of the identified partitions is processed before processing of the compound modification takes place.

A client can thus process serialized modifications over incoming channels using the method that follows (flowchart provided in FIG. 6), using reasonable fairness (refer to comments subsection later) for picking modifications in all of the following: The client picks a modification from any one of the (unblocked) channel outputs. If it is an ordinary modification, the client processes it in one atomic step and then goes back to the channels to pick the next modification from any of the (unblocked) channel outputs. Somewhere along the way, the client picks a tagged compound modification from a channel output. If the modification is compound over one partition alone, then the client processes it in one atomic step. Otherwise, the client cannot process the modification alone by itself. The client thus leaves the modification alone and goes on to other (unblocked) channels in order to pick and process modifications from them. In order to maintain channel order in the modification stream whose compound modification has been left alone, the client cannot pick any modifications from that stream till the compound modification has been processed. Thus, the channel from which the compound modification had been picked is blocked out from the set of channels from which the client can pick and process modifications after putting the compound modification aside. After the client has processed some other modifications from channels of other partitions (possibly even zero such modifications), it will find itself handling the same compound modification (with another tag) that it had put aside, coming from another channel that corresponds to an identified partition for the compound modification. The client has to put this modification also aside, block out its channel, and continue processing other channels till it has picked the compound modification for all of the identified partitions. When the client picks the compound modification for the last of the identified partitions, then the client can process the compound modification over all of the identified partitions in one atomic step and unblock their channels. The client can then go back to picking and processing modifications from unblocked channels as usual. It is possible for a client to be blocking out channels for separate compound modifications at one time. The modifications will get processed independently of each other following the procedure described above.

Notice that in what is described above, the final serialized stream of work space modifications can differ from client to client. This is because the procedure for converting serialized streams of modifications on work space partitions into one stream of modifications is not required to enforce the same behavior for each client. However, on a partition-by-partition basis, the final serialized stream seen by any client is equivalent to the final serialized stream seen by any other client.

A real-time collaboration implementation is parameterized by decisions as to what a modification is. In the context of an unpartitioned work space, a modification can be a sequence of user-level operations and/or some translation of the same. A modification can also be the complete, changed work space itself, or it can be a work space difference— changed work space minus unchanged work space. In the context of a partitioned work space, the definition of a modification shifts to a partition-by-partition basis. So an ordinary modification over a partition is any of: operations on the work space partition and/or their translation; the complete, changed work space partition; difference in the work space partition.

When a modification is defined as a work space partition difference or a sequence of operations on a work space partition and/or their translation, then the modification requires a context before it can be applied. The context has to provide the unchanged partition upon which the application of the sequence of operations or partition difference can yield the changed partition.

When a modification is defined as a complete, changed partition, then it carries the context of the modification with itself. This means that the modification by itself is sufficient to determine uniquely the changed partition, which in this case is trivially true, since the modification is itself the changed partition.

Differences in the choice of the definition of a modification can lead to different behaviors of real-time collaboration at the user level. When a modification carries its context with itself, then it is always the case that collaboration participants see the shared work space change and develop as per some series of intentions of individual participants. On the other hand, when a modification does not carry its context with itself, then it is possible for modifications to compose in some manner that does not reflect an intention of any participant. For example, two participants attempting to delete the same word in a text document can send delete operations out at the same time. The result can well be the successful deletion of the target word along with an unintended deletion of the word preceding the target word. A shared work space can thus develop unintended changes including even nonsensical changes that lead to run-time errors when the definition of modifications does not require the carriage of modification context with a modification.

When a modification carries its context with itself, then collaboration participants can see the analogue of acoustic echos in real-time collaboration: a distant/low-bandwidth-linked participant can send out modifications that repeatedly set the shared work space back to a state that is far behind what other better-connected participants have developed it to; participants are thus forced to deal with echos of the work space coming back from the distant participant.

A variant of the carriage of context within modifications scheme is a scheme in which instead of the full context, a context identification is carried within a modification. A modification thus no longer incurs the cost of full carriage of context. In this scheme, a server (centralized server in the unpartitioned collaboration system case and the relevant partition server in the distributed-server-based case) remembers the last modification it picked for its FIFO queue. The server picks a new modification for its FIFO queue only if the modification has (the identity of) the last modification as its context identification. The server rejects and throws away any modification carrying an older modification (the identity of the older modification) as its context identification. Thus, this scheme uses the history of serialization in carrying out further serialization of modifications. This scheme does not suffer from the effect of echos like the simple full-context-carriage scheme.

A distributed server works straightforwardly with any of the definitions of a modification discussed above. Ordinary modifications can be serialized by a partition server on a history basis. Inter-partition modifications or compound modifications are treated as context insensitive by partition servers. Thus, compound modifications are kept independent of history-based serialization by partition servers. The sequencing of compound modifications among themselves follows the relative positions they are assigned by the collaboration server. The interleaving of sequences of compound modifications and ordinary modifications is indeterminate. It is left to be implementation dependent/non-deterministic.

For any real-time collaboration session, a distributed server can be built as follows. For the session's work space's partitions that are available, machines are identified that will host the partition servers corresponding to the partitions. The machines are communicated with to build partition servers on the machines. Similarly, a machine to host the collaboration server is identified and then the machine is communicated with to build the collaboration server. Each client participating in the collaboration session is communicated with to establish an interface at the client with which the client will communicate with partition servers. Forward and backward channels are then established between the partition servers and the clients. Each client is provided the address of the collaboration server and the collaboration server is provided the address of each client so that clients and the collaboration server can communicate with each other.

Comments

Every partition server in a distributed server is required to be reasonably fair in picking unblocked modifications (modifications that have not been blocked due to relative-position sequencing) from the outputs of channels coming into the partition server. Similarly, every client is required to be reasonably fair in picking unblocked serialized modifications available at outputs of channels coming from partition servers. Reasonable fairness means that if an unblocked modification is available to be picked at some channel output, then it will eventually get picked (i.e., within finite time). A simple way of implementing reasonable fairness is as follows: After a partition server or a client has picked a modification from a given incoming-channel output, it tries picking from all of its other incoming-channel outputs before it picks another modification from the given channel output. The partition server or client does not succeed in picking from a channel output only if the channel output is blocked, or if the channel output is empty at the time the attempt at picking is made. This scheme is reasonably fair because once a given unblocked modification becomes available at a channel output, it takes at most a finite number of modifications to be picked and processed before the given modification is picked (the number of channels is finite). Since picking and processing time of a modification is finite, the maximum time taken before the given modification is picked is finite.

Another comment on the topic of fairness in the context of a distributed server comes from the fact that the distributed server is made from FIFO structures alone. There is an inherent advantage of FIFO in comparison to last in first out or LIFO since processing of new entries in LIFO can delay indefinitely the processing of old entries in LIFO (every time the turn of an old entry comes up, a new entry shows up preempting the old entry). Since the distributed server uses FIFO alone, it is never the case that processing of new modifications blocks indefinitely (and thus unfairly) the processing of older modifications.

An optimization that is straightforward in distributed servers is to eliminate unnecessary copying of data in compound modifications in the interface of clients to partition servers. When a client sends out a compound modification, then for each partition server corresponding to an identified partition, it replicates the modification and then sends the replica along with a tag to the partition server. Minimally, the client does not need to send out more than one full copy of the compound modification. It does not matter which partition server is sent the full copy, the other partition servers only need to be sent bookkeeping data on the compound modification—what are the identified partitions for the compound modification, the partition-server-specific tag of the compound modification. The elimination of unnecessarily-copied data also reduces the communication load on the interconnection network and the processing load on partition servers.

Channel and modification sharing can be provided as an optimization in a distributed server implementation. Channel and modification sharing can lead to gains such as the following: When a compound modification over all partitions is sent out, then in actual implementation, only one modification per machine hosting partition servers is sent out. In such a case, say one large channel from a client to a machine implements all channels from the client to partition servers on the machine by multiplexing them. The multiplexing is such that it allows a compound modification over multiple partition servers on the machine to be collapsed into one copy alone that is actually transmitted on the large channel. Without optimization, a compound modification serialized by N partition servers on a machine would lead to N broadcasts to all clients from the machine. With channel and modification sharing, the N broadcasts can be collapsed into one broadcast from the machine to all clients. Another optimization that is feasible in the context of a distributed server is the interleaved implementation of say all partition servers on a machine by one software process running on the machine. Such a process can handle a collapsed, single, compound-modification copy for all of its partition servers in one step whenever useful and feasible.

For improving communication performance, sending several modifications out at the same time by packing them into one granule of modifications can be useful. In a distributed server implementation with such granularizing, unless the implementation is willing to entertain the breaking of granules while in transit, then for any partition, the implementation should avoid packing multiple non-consecutive compound modifications on that partition into one granule. If multiple non-consecutive compound modifications on a partition are packed into a granule, then the partition's partition server will have to break the granule up in order to process it.

While the invention has been described in terms of an illustrative preferred embodiment, those skilled in the art will recognize that the invention can be practiced with modification within the spirit and scope of the appended claims.

Having thus described our invention, what we claim as new and desire to secure by Letters Patent is as follows:

1. A method that improves the scaleability of real-time collaboration by providing distributed servers as a substitute for centralized servers used in real-time collaboration, each distributed server providing a functionality that is equivalent to a basic functionality provided by a centralized server, the method comprising the steps of:

building a distributed server that is applicable and specific to a real-time collaboration session and that includes two or more, independently-communicating, asynchronous, independent software processes that can be run simultaneously on one or more, heterogeneous or homogeneous, interconnected computers and/or computing elements; and providing for each said real-time collaboration session and associated distributed server an unchanging disjoint partitioning of said collaboration session's complete shared work space where one or more disjoint partitions together at any time cover the entire work space and are available at all times during said collaboration session, with no partition being created and/or deleted during said collaboration session, and at least one client that actively or passively participates in said collaboration session, wherein each said client that participates in said collaboration session does so for the entire duration.

2. The method according to claim 1, wherein said two or more software processes included in any said distributed server comprise for each said one or more disjoint partitions, a partition server corresponding to each said partition, and a collaboration server, wherein said partition servers are connected with said clients required by said distributed server by channels which are first in first out (FIFO) communication structures, said channels being a part of the distributed server, the distributed server including an interface by which said clients can communicate with any said partition server of said distributed server.

3. The method according to claim 1, wherein for any said distributed server with its said one or more disjoint partitions, a modification of said work space is either an ordinary modification wherein only one said partition is modified, or a compound modification, wherein one or more said partitions are modified.

4. The method according to claim 3, further comprising the step of providing said distributed server for any said collaboration session with a modification-serialization functionality that is equivalent to that which can be provided by a centralized server for said collaboration session, the modification-serialization functionality comprising for any partition of said work space, the sequence of serialized said ordinary and said compound modifications over said partition for a said client is the same as that for any other said client, there does not exist a said partition of said work space for which there exists a pair of said modifications over said partition such that both said modifications that originate from the same said client and the relative order between the two said modifications after said serialization differs from said relative order in which they originated from their common client, and for any said client and for any said serialized compound modification, the processing of said compound modification by said client succeeds the full processing by said client of every said serialized modification such that said serialized modification is over any of the identified partitions over which said compound modification takes place and said serialized modification precedes said compound modification.

5. The method recited in claim 4, wherein said compound modifications comprehensively allow any said distributed server to accept hierarchical or other, partition groups in said real-time-collaboration session, a hierarchical partition group corresponding to a hierarchical partition arrangement in said work space partitioning of said real-time collaboration session, wherein entire said hierarchical arrangement can be affected as a whole by one said modification.

6. The method recited in claim 5, wherein in any said distributed server, multiple partition groups can coexist and be in various stages of simultaneous processing at any time and, in any collaboration session, partition groups can be created, used, and abandoned as and when needed through the course of the collaboration session.

7. The method recited in claim 3, wherein in any said distributed server, inter-partition synchronization, including serialization, is based on relative positions of a said compound modification over identified partitions, wherein a collaboration server provides said relative positions for each said compound modification.

8. The method recited in claim 1, wherein said distributed servers have additional extensibility because of inter-partition synchronization.

9. The method recited in claim 2, wherein in any said distributed server, said partition servers rely on a FIFO-queue basis for serialization.

10. The method recited in claim 9, wherein in order to allow said partition servers to handle said compound modifications, said FIFO-queue-serialization basis is augmented to require a reasonable amount of fairness in picking from available said modifications, and uses relative positions of said compound modifications provided by a collaboration server in making said modifications available for picking.

11. The method recited in claim 9, wherein in any said distributed server, said partition servers can use past serialization decisions to serialize current modifications.

12. The method recited in claim 3, wherein a said ordinary modification over a said partition can be any of user-level operations and/or some translation of the same, the changed partition itself, and the difference in the partition from before it changes to after it has changed.

13. The method recited in claim 1, wherein for any distributed server, each of said software processes and client interfaces that enable clients to communicate with any partition server included in said distributed server are implemented both sequentially and concurrently.

14. The method recited in claim 2, wherein optimizations including sharing of said channels and said modifications, process sharing by said partition servers, and granularizing of said modifications are implemented in said distributed server.

15. The method recited in claim 1, wherein for any said distributed server, some or all of the said two or more software processes included in said distributed server are implemented in hardware.

* * * * *